(12) United States Patent
Mullins et al.

(10) Patent No.: US 9,094,543 B2
(45) Date of Patent: *Jul. 28, 2015

(54) REAL TIME TRANSMISSION OF PHOTOGRAPHIC IMAGES FROM PORTABLE HANDHELD DEVICES

(71) Applicants: James Anthony Mullins, Round Rock, TX (US); Alex Robert Woods, Rocklin, CA (US)

(72) Inventors: James Anthony Mullins, Round Rock, TX (US); Alex Robert Woods, Rocklin, CA (US)

(73) Assignee: Alex Robert Woods, Rocklin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,156

(22) Filed: Jan. 13, 2014

(65) Prior Publication Data

US 2014/0125822 A1    May 8, 2014

Related U.S. Application Data

(63) Continuation of application No. 13/491,026, filed on Jun. 7, 2012, now Pat. No. 8,634,712, which is a continuation-in-part of application No. 11/715,049, filed on Mar. 6, 2007, now Pat. No. 8,224,178.

(51) Int. Cl.
| | |
|---|---|
| *G03B 19/00* | (2006.01) |
| *H04N 7/14* | (2006.01) |
| *H04N 11/00* | (2006.01) |
| *H04N 1/00* | (2006.01) |
| *H04N 1/21* | (2006.01) |
| *H04N 1/32* | (2006.01) |
| *H04N 5/232* | (2006.01) |
| *H04N 21/61* | (2011.01) |
| *H04N 101/00* | (2006.01) |

(52) U.S. Cl.
CPC ....... *H04N 1/00214* (2013.01); *H04N 1/00108* (2013.01); *H04N 1/00244* (2013.01); *H04N 1/00307* (2013.01); *H04N 1/2112* (2013.01); *H04N 1/32128* (2013.01); *H04N 5/232* (2013.01); *H04N 21/6156* (2013.01); *H04N 1/00204* (2013.01); *H04N 2101/00* (2013.01); *H04N 2201/0039* (2013.01); *H04N 2201/0055* (2013.01); *H04N 2201/0084* (2013.01); *H04N 2201/3226* (2013.01); *H04N 2201/3253* (2013.01); *H04N 2201/3266* (2013.01)

(58) Field of Classification Search
USPC ................................ 396/429; 348/14.02, 552
See application file for complete search history.

(56) References Cited

U.S. PATENT DOCUMENTS

| | | | |
|---|---|---|---|
| 6,182,219 | B1 | 1/2001 | Feldbau |
| 6,370,568 | B1 | 4/2002 | Garfinkle |
| 6,584,564 | B2 | 6/2003 | Olkin |
| 6,662,226 | B1 | 12/2003 | Wang |

(Continued)

*Primary Examiner* — Rochelle-Ann J Blackman
(74) *Attorney, Agent, or Firm* — Inventive Patent Law P.C.; Jim H. Salter

(57) ABSTRACT

A system and method for effectively performing a streamlined photo distribution procedure is disclosed. A source device initially captures a photographic image of a target or subject using known techniques. The term "photographic image" as used herein is not limited to single photographs but includes moving pictures, video images and any other known or future means of capturing an image of an event. The source device is likewise broadly defined and includes, but is not limited to, digital cameras, video cameras, cell phones with digital photo capture means, computers, including PDAs or other devices or combination of devices with communication and photo capture means, and other image capture means.

20 Claims, 7 Drawing Sheets

(56) References Cited

U.S. PATENT DOCUMENTS

| | | |
|---|---|---|
| 7,028,184 B2 | 4/2006 | Hind |
| 8,224,178 B2 * | 7/2012 | Keane et al. ............... 396/429 |
| 8,634,712 B1 * | 1/2014 | Mullins et al. ............. 396/429 |
| 2003/0085989 A1 | 5/2003 | Tay |
| 2005/0062851 A1 | 3/2005 | Silverbrook |
| 2005/0114459 A1 | 5/2005 | Tu |
| 2006/0114338 A1 | 6/2006 | Rothschild |
| 2007/0073937 A1 | 3/2007 | Feinberg |

* cited by examiner

REAL TIME TRANSMISSION OF PHOTOGRAPHIC IMAGES FROM PORTABLE HANDHELD DEVICES

RELATED APPLICATIONS

This application is a continuation patent application and claims the priority benefit of co-pending U.S. patent application Ser. No. 13/491,026, filed on Jun. 7, 2012, titled "REAL-TIME TRANSMISSION OF PHOTOGRAPHIC IMAGES FROM PORTABLE HANDHELD DEVICES" and assigned U.S. Pat. No. 8,634,712, which is a Continuation-In-Part patent application of U.S. patent application Ser. No. 11/715,049, filed on Mar. 6, 2007, titled "REAL TIME TRANSMISSION OF PHOTOGRAPHIC IMAGES FROM PORTABLE HANDHELD DEVICES," now U.S. Pat. No. 8,224,178, all of which are incorporated herein by reference in their entirety.

FIELD

The invention relates generally to a simplified process for real time capture using a remote device and transmission of electronic information, which includes photo or video images along with a voice memo and geographical data, via a wireless network to a target location, such as a live website. More particularly, it is directed to techniques and devices for capturing photographic or video images (for example, using a digital camera or a cellular telephone) and automatically or easily transmitting those images in a secure manner to a pre-designated site along with descriptive material regarding the image such as time, date, geographical location, and photographic data along with a verbal or written description of the image. This information can also be applied to the image in an unmodifiable, verifiable manner so that it can constitute legally acceptable evidence regarding the image captured and the data contemporaneously added to the image.

BACKGROUND

Systems and equipment are currently available that allow the capture of photographic or video images with a camera or cellular phone/camera combination, transferring the photo or video to portable memory devices, and then connecting the portable memory device to a computer and saving the image in memory devices which are a part of the computer, with a designated file name for the photo or video being added by the computer operator. The computer operator can also add a caption to the image, and it can be posted to a website or transmitted over computer linkages to other parties. Available equipment can also provide a legend on the images of the date and time of the image, if the equipment is pre-programmed to do so by the user.

The prior art includes several examples of methods to provide the sender the capability to prove both the dispatch, the receipt, and the contents of material sent electronically as well as to protect the information received by the recipient so that it is resistant to tampering or modification or at least indicates that the information has been modified from that original sent. These techniques may also include encryption so that only authorized recipients are allowed to view the transmitted information. U.S. Pat. No. 6,182,219 to Feldbau et al. is one example of such a data transmission scheme. U.S. Pat. No. 6,584,564 to Olkin et al. and U.S. Pat. No. 7,028,184 to Hind et al. are examples of secure email systems.

U.S. Pat. No. 6,662,226 to Wang et al. is directed to a system to facilitate the capture, processing, and archiving of user interactive events which may appear as a screen image on devices within a communications network such as a cell phone, personal digital assistant (PDA), or personal computer (PC). The user can interact with the device directing that a captured image, which is stored in the device or transferred to a designated remote server device, may include words or phrases, highlighted portions of the image, certain validation information such as a time stamp, users' identity information, or the device information.

U.S. Pat. No. 6,370,568 to Garfinkle is directed to a digital camera having an image processor that can communicate a picture (image) taken with the camera over a bus to a processor in a remote computer. The processor sends the image to a telecommunications link, such as a cell phone, which in turn sends the image to a designated electronic mailing address. The processor can be programmed to immediately transmit the image or delay transmission so the user can add information to the image being sent using the computer key board and computer mouse. While the camera has the capability for transmitting an image to a computer, it does not provide the ability to add descriptive information to the image when it is taken. This task is accomplished at a later time when the user has time to access the computer and label the images.

Published application Ser. No. 2005/0114459 to Tu et al. is directed to a photo distribution procedure. A photo source, such as a camcorder, digital camera, cell phone with photo capability, or a webcam, provides photo data to a device programmed to send the photo data to designated targets.

There are also services and software that can be utilized to assist cell phone users in simplifying and streamlining the process of uploading photos and videos from camera-equipped cell phones to remote locations.

According to ShoZu (formerly Ognima), software installed in a cell phone assists the user in transferring the images captured by the digital phone, camera to the user's video or photo sharing website using a single click. The ShoZu marketing information states that the user is provided with the ability to add titles, descriptions, and tags to the image before or after it is uploaded. If the phone is equipped with Global Positioning System (GPS) capability, geo-tags can also be added to the transferred photo.

PixSense, Santa Clara, Calif., claims their patent pending compression software allows for high resolution digital images to be transferred, with a single click, from a mobile phone to a dedicated website. Based on their public announcements, the user must then access the website to add information to the images received at the dedicated website, because the desired information is not transferred with the images.

However, these existing processes are cumbersome for the user because they involve several steps, and they require time and various technologies to complete all the steps. Further, it is subject to faulty memory when the labels are added to the website images, and the legends applied may be tampered with or modified by the user or recipient. Therefore, there is a need for a simple, automated, user-friendly, and streamlined process that eliminates individual steps required for transmission, posting, and labeling of images captured by a remote digital photo device.

There is also a need for photo capture and transmission devices that provide enhanced device functionality while still maintaining a sufficient level of user-friendliness and ease-of-operation for the common consumer who may have a lesser level of technical sophistication. Additionally, for some purposes, the provenance and authenticity of images need to be guaranteed.

While various devices provide means to add some information to the image transmitted, no prior devices provide systems that enable a user to provide a recorded voice memo and then transmit, transcribe, and post a readable text to a website or other target posting location in real time. In addition, no system is known that enables a user to transmit and post a photo, or video, and an audio file captured from a remote device to a website in real time. Still further, there is no system which provides the capability to capture a photo image, transmit that image to designated targets in a secure manner and, at the same time, automatically identify the parameters of the image (time, date and location, etc.) and add electronically transmittable comments regarding the image.

SUMMARY

In accordance with the present invention, a system and method for effectively performing a streamlined photo distribution procedure is disclosed. A source device initially captures a photographic image of a target or subject using known techniques. The term "photographic image" as used herein is not limited to single photographs but includes moving pictures, video images, and any other known or future means of capturing an image of an event. The source device is likewise broadly defined and includes, but is not limited to, digital cameras, video cameras, cell phones with digital photo capture means, computers, PDAs, or other devices or combinations of devices with communication and photo capture and other image capture means.

A streamlined process and apparatus is set forth for the real time capture, transmission, and posting of photos or videos to a live website, or one or more other target locations, with the automatic inclusion of information regarding the photo, such as geographical location, time of the image, and other elements capable of being captured from a remote device. This simplified process eliminates the need for the user to enter that information or to transmit, transcribe, organize, authenticate, upload, and post elements captured from a remote device. The system allows the user to add descriptive information or commentary regarding the image by a keyed entry or, alternatively, verbal description, which is directly converted to a written description using voice recognition software.

DETAILED DESCRIPTION

Figure 1:
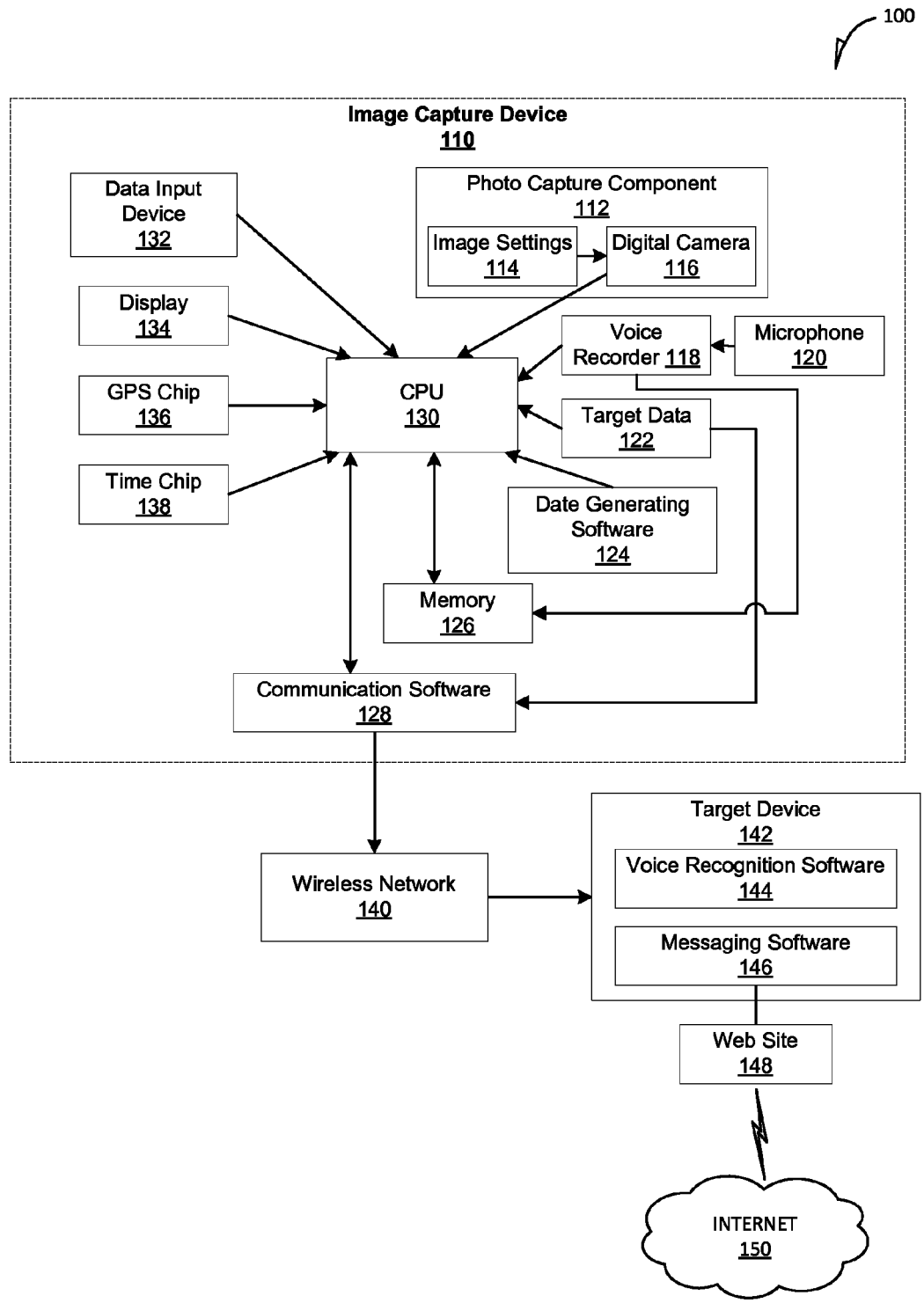
FIG. 1 is a block diagram of an image transmission system, in accordance with one embodiment of the present invention.

A photograph image capture device 110 provides for a streamlined, real time transmission of the image to a target site along with descriptive material, geographical location, and other image specific elements. This streamlined process provides the user the ability to pre-establish the information to be collected and the address of the target or targets so that no individual action beyond capturing the image is necessary in order for the user to capture the image and transmit, transcribe, organize, upload, and post elements captured by the image capture device 110.

Systems and software are available for the transmission of computer generated data and particularly emails from a source to a recipient site in a manner which assures that the document received at the recipient end is a true copy of the original and that subsequent transmissions thereof provide the same document in an unmodified form. Further, these programs provide unmodifiable and verifiable data as to the time the document is transmitted and/or received. However, in many instances, the critical information is not about when the document or data is transmitted but when the document or data was generated. For example, where the document is a photographic image, the time it is transmitted is not as important as when and where (and possibly how) the image was captured. Further, it is also desirable to provide a contemporaneous verbal or written description of what is being photographed and possibly what transpired immediately prior to or after the image was taken. This capability would provide, to a traveler, the ability to generate a digital image of a subject (friends or relatives, scenery or buildings, sports events, etc.) and automatically transmit each image as it is taken to a remote designated site for storage or access by others. The image received at the target site is accompanied by all the information necessary to determine where and when the picture was taken along with an oral or written narrative describing the event. Likewise, such capability would have unique value to news photographers, law enforcement personnel gathering information about a crime scene, real estate sales personnel collecting data on properties for sale, archivists collecting data to memorialize events, photo artists who wish to keep a record of how and when the photo-art image was created, and numerous other situations where a contemporaneous record of an event is of importance.

While technology exists to perform each of the various functions set forth herein independently, no system has been constructed which assembles all of the components in a single, easily manipulated and controlled manner and provides the user the interoperability necessary for all, or selected ones, of the functions to be performed with the ability to, contemporaneously with the image capture, send that image in a controlled and secure manner to a desired location for storage and display, with the image received at the target site including sufficient data to immediately, and in a tamper proof manner, fully identify when, where, and how the image was captured along with the user's contemporaneous description of the event captured in the image. In a preferred embodiment, a user is able to record a voice memo using the image capture device 110, and then transmit, transcribe, and post a photo or video, along with the audio file contemporaneously captured, to a website or other target posting location in real time, with the audio file being available at the target site as an audio output or readable text.

While the system has the capability of transmitting multiple pieces of information to the remote site, the user may choose to transmit selected pieces of information. All elements capable of being captured on a remote device need not be included in the real time transmission and posting process. For example, a user may capture a single photo, without capturing any other accompanying elements, and then transmit and post the single photo to a website in real time. Prior to capturing the elements using the remote image capture device 110, the user can pre-designate preferences such as selecting one or more target posting locations and enabling or disabling other automatic inclusions such as camera settings, geo-codes or geo-tags, or time and date displays.

In one embodiment, a user can capture a video with the remote image capture device 110, capture the geo-code of the device user's location, and then transmit and post the video to a predefined intranet or Internet site in real time. Alternatively, the user may capture a photo, orally record a photo title and a description of the subject being photographed, capture identifier tags for the photo, and then transmit and post the photo, subject description, and tags as one unit to a pre-defined, personalized social networking webpage in real time.

The present invention thus provides a streamlined, efficient, and user-friendly mechanism for distributing photographic images along with all relevant data regarding the image to remotely located, designated target devices.

Various modifications to the disclosed embodiments will be readily apparent to those skilled in the art, and the concepts set forth herein may be applied to other devices for immediate transmission of information captured in other than a photographic format. Thus, the present invention is not intended to be limited to the embodiments shown or described, but is to be accorded the widest scope consistent with the principles and features described herein.

Digital camera devices have traditionally been stand-alone offline devices. On the other hand, cellular phones have recently been configured to include a digital camera along with the capability to transmit digital images separate from or during a telephone conversation to the other party of the telephone conversation. Certain embodiments of the present invention effectively combine functionalities and improved image quality of digital cameras with the communication capabilities of cellular phones or computers in an online networked environment to support an automatic streamlined distribution model for the transfer of digital images along with various appropriate types of electronic information.

The present invention comprises a system and method for effectively transmitting a photographic image to a target device in an electronic network, and a data manager for identification and description of the image captured and transmitted. The user can program the image capture device to automatically access data related to the image captured to automatically create a message and attach the data and message to the photograph image so that an observer at the target site has informational details regarding the image transmitted, all occurring in real-time.

In some embodiments, to guarantee the provenance and authenticity of images captured and transmitted, authentication and anti-tampering mechanisms can be applied. One such mechanism can include hashing. When an image is captured, a secure hash for the image can be computed using a secure hash algorithm (for example, SHA-2). The computed hash output can be appended to the captured image and transmitted to a target device. Upon receipt, the target device can extract the secure hash output, compute a separate secure hash for the transmitted image and compare them to each other. The secure hash code for the transmitted file can be stored, in a database with the transmitted image. The originality of the image can be identified by a means of comparing the hash of the presumptive original image to the stored hash. This way it can be confirmed that that this is the original image and has not been tampered with.

Hashing may be used in combination with digital signatures. The user may sign the hash output using his private key in the usual way known by those skilled in the art, and transmit the signed hash output and captured image to a target device. The signed hash can be stored in a database separate from the captured image, and when required, the digital signature can be verified with the user's public key.

In a preferred embodiment, authentication and anti-tampering mechanisms can be further improved by using steganography. Using steganography facilitates permanently embedding the signed hash into the actual image source as a watermark, with the removal of the watermark possible only by using a steg key. Additionally, the signed hash has no impact on the quality of the image.

Referring now to the drawings, FIG. 1 is a block diagram of an electronic network 100 for the capture and transmission of a photographic image along with data relevant to that image. The electronic network 100 may preferably include, but is not limited to, an image capture device 110, a wireless network 140 for transmitting the captured image, and one or more target devices 142 for receiving the image. One or more of the target devices 142 can be programmed to further distribute the received image information over the Internet 150 to designated addresses. Features and functions included in the image capture device 110 are described below. The wireless network 140 can be any of various presently available systems, or systems which may be developed in the future, for transmitting data from a source to a recipient including, but not limited to, wireless or cellular networks, the Internet, or combinations thereof. Thus the captured data and images may be transmitted by wireless transmission (one skilled in the art will recognize that a broad range of frequencies have been dedicated to transmission of data and voice signals), cellular networks, satellite communications systems, or through hardwire or optical cable networks, or any combination of these techniques used to transmit data. As shown schematically in FIG. 1, the remote image capture device 110 transmits and posts captured images in an electronic format to one or more target posting locations in real time. While FIG. 1 shows one target device 142, this may also represent several target devices 142. Target posting locations include, but are not limited to, the Internet, an intranet, a file server, a third-party database, a hard drive, or other networked location. The remote device and the target posting location may communicate with each other using appropriate peer-to-peer communication techniques. The target devices 142 can also be any of numerous devices currently used to receive and display such information such as cellular phones, computer networks, or video display systems. In a preferred embodiment, the image capture device 110 is a camera equipped cell phone or a digital camera in direct communication with a cell phone, the image and information is transmitted through a cellular wireless network 140, and the target device 142 is a designated web site accessible by authorized recipients through the Internet or a computer programmed to receive and further distribute the information received.

The invention is not intended to be limited to the embodiments shown or described but to encompass the widest scope of image capture, alternative transmission, and targets consistent with the system and features described.

Numerous devices currently exist for capturing an image. The remote image capture device 110 may include, but is not limited to, cellular phones, digital cameras, digital video recorders, webcams, PDA, and other portable or hand held computer systems which include image capture capability.

The image capture device 110 may be an assembly of devices comprising a combination of components (for example, a digital camera connected wirelessly or hardwired to a cell phone) that can also interface with a PDA or portable computer, all interconnected at the image capture/transmission end of the system. Alternatively, a single device such as an iPhone or Android, which is a palm hand-held computer with cell phone and digital image capture capabilities, can be programmed to provide all of the described capability. The remote image capture device(s) 110 or assembly can also store the captured electronic information and image locally. Functions included in the remote image capture device(s) 110 or assembly can include, but are not limited to, a photo capture or video capture digital camera 116, voice recorder 118 attached to a microphone 120, voice recognition software 144 (which may be located either in the image capture device 110 or the target device 142), location identifying capability such as a GPS chip 136 and satellite communications capability (referred to as geo-coding capability), date generating software 124 capable of periodically displaying local time (for example, a time chip 138 for receiving data transmission from an official time source, such as the Time Service Department of the U.S. Naval Observatory Master Clock, which continuously transmits accurate standard time signals), or any other type of electronic information that may be captured with the remote device. The image capture device 110 also provides an address module which includes target data 122. The user can enter and store addresses in the address module and then select target addresses, such as phone numbers or Internet addresses of target devices 142.

The present technology provides to the user of the image capture device 110 the ability to automatically add various photo identification tags and written descriptors to a photographic image record received at the target site. This includes the GPS generated geographic location of the remote device and accompanying voice recordings. The image capture device 110 can also include voice recognition software 144 to translate the voice recordings into readable text, or the recorded message can be sent as a verbal message, in the same manner as a cell phone transmits the spoken word, with the verbal description converted into written text by an intermediary server or voice recognition software 144 at the target device 142. The photo, accompanying verbal or readable text elements, geo-code, and other data can be posted to the user-defined target location in real time with a copy stored in the memory 126 of the image capture device 110 or placed in memory 126 for later transmission. The system provides the remote device user with the ability to capture and transmit all the electronic information using a single click contemporaneous with the image capture or, at the user's choice, at some time thereafter following verification by the user of the generated date and voice record. In either event, the image is transmitted together with data generated at the moment of the image capturing. If sent at a later time, data regarding the transmission parameters can also be added.

In alternate embodiments, the electronic network 100 may readily be implemented using various components and configurations in addition to, or instead of, those discussed in conjunction with the FIG. 1 embodiment.

In the FIG. 1 embodiment, the image capture device 110 and target device(s) 142 may be implemented as any type of appropriate electronic devices. For example, in certain embodiments, the image capture device 110 and target device(s) 142 may be stationary or portable consumer-electronics data or information collection and display devices, as further discussed below. In the FIG. 1 embodiment, image capture device 110 and target device(s) 142 may utilize appropriate communication software 128 to transmit the information from the image capture-device 110 through a wireless network 140 to the target device 142. The target device 142 can also have appropriate messaging software 146 for posting the received image and appended data, to a website 148, and thus to the Internet 150.

In the FIG. 1 embodiment, photo capture component 112 of the image capture device 110 may include any appropriate source of photo data. For example, the photo data source may include, but is not limited to, various types of electronic camera devices that may capture photo data. In certain embodiments, the photo data source may also include other electronic devices capable of either capturing or storing photo data for subsequently downloading to image capture device 110. For example, the photo data source may include, but is not limited to, a camcorder (a portable video camera with built-in recorder), a digital camera 116 such as shown in FIG. 1, or a webcam device that is configured to capture and provide photographic image data. In addition, in accordance with the present invention, the image capture device 110 may receive or access any other desired type of data for performing a streamlined distribution procedure. The concepts and principles of the present invention are therefore not limited to distributing image data, but may readily be applied to any other type of electronic information.

In accordance with the present invention, image capture device 110 automatically transmits the image and photo data to one or more designated target device(s) 142, which can then automatically store the transmitted, photo data locally for use by corresponding users of the target device(s) 142. In certain embodiments, the Internet 150 or any other type of electronic data distribution network including, but not limited to, an intranet configuration, may be used to further distribute the transmitted image and data. Furthermore, in other embodiments, the image capture device 110 and target device(s) 142 may alternately communicate directly with each other using appropriate peer-to-peer communication techniques. The implementation and utilization of image capture device 110 is further discussed below in conjunction with FIG. 3.

Figure 2:
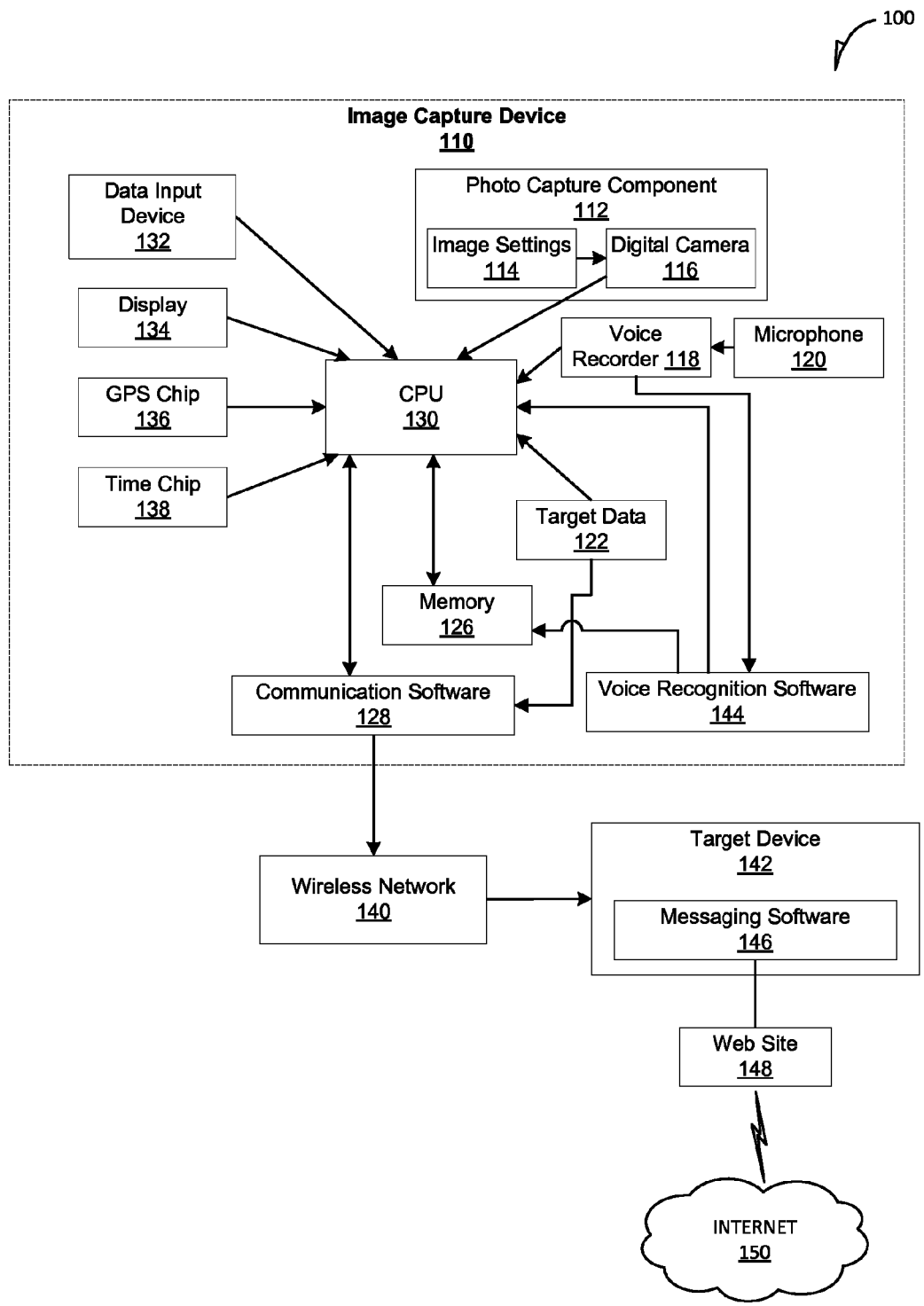
FIG. 2 is a block diagram of a second embodiment of an image transmission system incorporating features of the invention.

Referring to FIGS. 1-2, block diagrams for two embodiments of the image capture device 110 are shown, in accordance with the present invention. The image capture device 110 preferably may include, but is not limited to, a central processing unit (CPU) 130, a display 134, a memory 126, and one or more input/output (I/O interfaced) interface(s). The foregoing components of image capture device 110 may preferably be coupled to communicate with each other to assemble the image and data collected, place a copy thereof in memory 126, and transmit the assembled information to the wireless network 140 for receipt by the target device 142. In alternate embodiments, image capture device 110 may readily be implemented using various components and configurations in addition to, or instead of, those discussed in conjunction with the FIG. 1 embodiment.

In the FIG. 1 embodiment, CPU 130 may be implemented to include any appropriate and compatible microprocessor device that preferably executes software instructions to thereby control and manage the operation of image capture device 110. In the FIG. 1 embodiment, display 134 may include any effective type of display technology, including a cathode-ray-tube (CRT) monitor or a liquid-crystal display (LCD) device, with an appropriate screen for displaying information to the device user. In the FIG. 1 embodiment, memory 126 may be implemented to include any combination of desired storage devices, including, but not limited to, read only memory (ROM), random access memory (RAM), and various types of non-volatile memory, such as floppy disks, memory sticks, compact disks, or hard disks.

In the FIG. 1 embodiment, data input device 132 may include one or more input and/or output interfaces to receive and/or transmit any required types of information supplied by the user. The data input, device 132 may include one or more means for allowing a device user to communicate with the CPU 130. For example, the foregoing means may include a keyboard device, a wireless remote-control device, microphone 120, a graphical user interface with touchscreen capability, a hand-held device controller unit, or a selection, button array mounted externally on image capture device 110. As shown in FIG. 2, a voice recognition software 144 can receive voice messages from the microphone 120 for control purposes to generate a text message.

While the above description is directed to the image capture device 110, the various target device(s) 142 can also include the same or similar configurations and functionalities as discussed above in conjunction with the FIG. 1 representation of image capture device 110.

The system software may include program instructions that are preferably executed by CPU 130 to perform various functions and operations for the image capture device 110. The particular nature and functionality of system software typically varies depending upon factors such as the specific type and particular functionality of the components included and data generated by or with, the image capture device 110.

Captured photographic images can include digital image data, corresponding to an electronic photograph captured from a photo data source (i.e., digital camera 116). In addition, the image captured may include various types of ancillary data associated with the corresponding digital image data. For example, the foregoing ancillary data may include, but is not limited to, an image capture date and time, an image capture location, image settings 114, image format information, and various types of user-generated, image annotation information. In certain embodiments, the foregoing ancillary data may be displayed, in conjunction with corresponding photo data, on both the display 134 and subsequently a display on the target device 142.

The transferred image includes photo identifier information verbally entered into image capture device 110 as part of the image collection and transmission process. The verbally entered information can be converted to text by voice recognition software 144 resident in the target device 142 (FIG. 1) or included as part of the image capture device 110 (FIG. 2). In accordance with the present invention, the target devices 142 may then use the verbally supplied photo information or text generated therefrom to automatically populate identified folders in the target devices 142.

Information received at the target can also include any appropriate type of additional information associated with the corresponding photo. For example, transmitted information may include information for cataloging, organizing, or identifying photo images.

Figure 3:
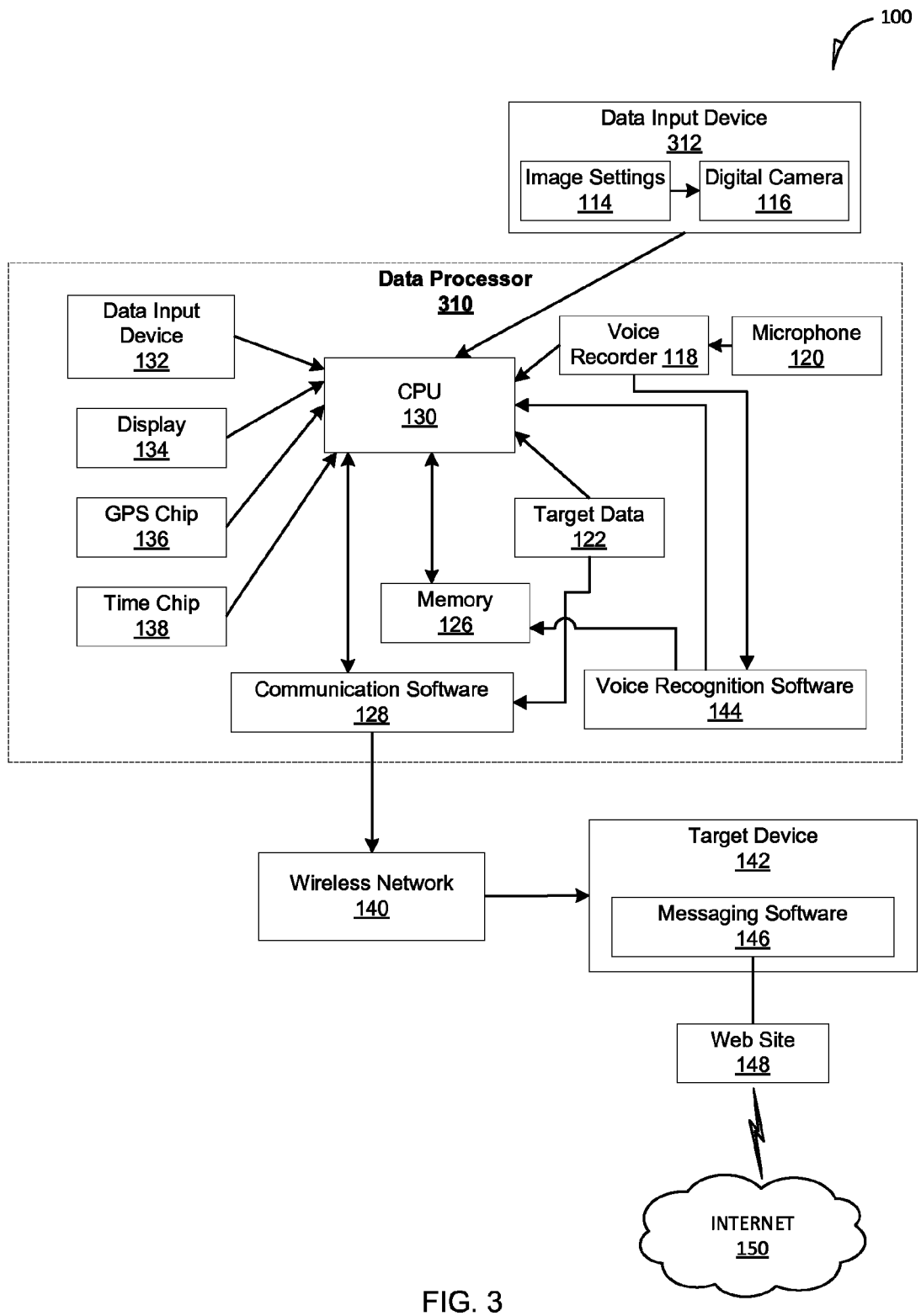
FIG. 3 is a block diagram of a further embodiment of an image transmission system in which the image is captured by a separate device that transmits the image to an intermediate processor.

While FIGS. 1 and 2 show the digital camera 116 as part of the image capture device 110, in certain embodiments of the present invention, as shown in FIG. 3, the photo source may be any appropriate type of portable electronic device with imaging capability (such as a digital camera 116) that may remotely capture photo data. The portable electronic device then automatically delivers the captured photo data to a data processor 310 via any appropriate distributed electronic network by which utilizing either wireless or hard-wired communications techniques. The data processor 310 includes all the components and functionality discussed above then assembles and transmits the image and appended data.

In certain embodiments, the device user may select a master target for automatically receiving photo and other data into a photo album. The master target would assemble the images. A device user may thus select an appropriate album address and thereafter propagate the photo data to additional message targets that share that particular photo album. For example, a first photo album may be shared by family members, a second photo album may be shared by a group of friends, and a third photo album, may be shared by a group of co-workers. In such a scenario, all family members may each have a copy of the first photo album on their individual devices. When one family member captures photo data and selects the first photo album address, then each copy of the first photo album may be automatically updated to include the captured photo data.

Designated message targets may receive photographs from the image capture device 110 or data processor 310 by utilizing corresponding target devices 142. Each of the target, devices 142 may then store the received photographs directly into an inbox of that target device 142. In such an implementation, if a particular message target is a member of more than one photo album group, then photographs for multiple different photo albums may be received and stored in the same inbox of the corresponding target device 142.

In order to use any of the embodiments of the invention set forth herein, or modifications thereof, the user would first populate a directory in the image capture device 110 with addresses of target devices 142. These can be websites where the image and related data is to be delivered or, alternatively, telephone numbers, such as cell phone numbers of designated recipients with phones having image display features. This can be accomplished in a manner similar to entering preselected phone numbers in a contacts list in a cell phone. The user would also preselect the type of data to be appended to the image (for example, time, date, GPS location, camera settings), and whether a verbal message, or text message created from the verbal message, is to be added, and when they are to be added (prior to image capture, simultaneous to image capture, or alter image capture). The data and form of message to be appended to the image may be separately entered for each image or set of images or may be included as standard instructions saved along with the target address in the contacts list. The user would also select whether a one click, two click, or multiple click technique is to be used, or whether images should be transmitted as taken or an album is to be assembled prior to transmission. These alternatives can all be selected using a touch sensitive image transfer setup screen on the display 134 or using selected buttons on the data input device 312.

Figure 4:
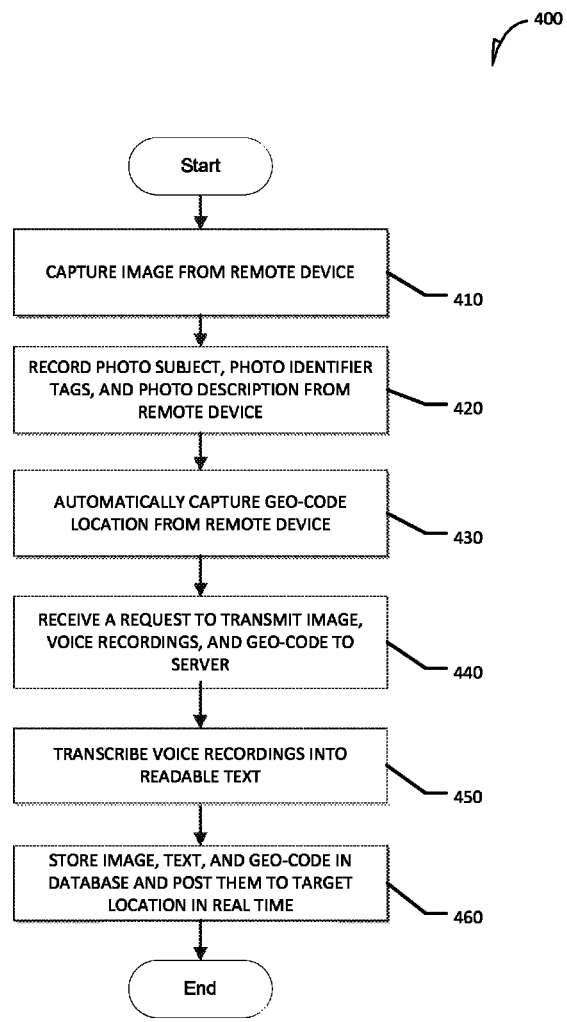
FIG. 4 is an operational flow diagram of a first embodiment of the invention illustrating the steps for capturing an image and automatically transmitting the image to a target with user selected and user supplied information.

FIG. 4 depicts an operational flow diagram 400 of some embodiments of the invention set forth herein. In step 410, an image is captured from a remote device. In step 420, data, such as photo subject data, identifier tags, and photo description, is captured from a remote device. In step 430, a geo-code location is automatically captured from the remote device. In step 440, a request to transmit data, such as an image, voice recording, and geo-code, to a server is received. In step 450, the server to which the data has been transmitted transcribes the voice recordings into readable text. In step 460, a system or systems stores the data, including image, text, and geo-code data, in a database and posts the data to a target location in real time.

Once the necessary operating parameters (target address, data to be appended, delivery procedure, etc.) are entered into the image capture device 110, the user can proceed with capturing images using the described device. If a single click operation is chosen, when the user snaps an image, the image is automatically transmitted to the target with all the appended data and the prior recorded verbal message. If the verbal message is recorded simultaneously, transmission will wait for completion of the message, which can be signaled by a word command ("end" or "send," for example). The image, data, and recorded verbal message (or text message generated therefrom) will then appear at the target after a lapse of time necessary for the data to be assembled, and transmitted over the wireless network 140. If the verbal message is to be added after the image is captured, the image and data generated with the first click are stored in the memory 126 of the image capture device 110. The user can add the verbal message immediately thereafter, and give the word command to send or use a second click. As a further alternative, the message can be added at some time thereafter, and the images with messages and data can be sent individually or as an album. As a further alternative, a single message can be added to a set of images prior to sending as an album. For example, if the images are of scenery, a single message such as "Three views of a fountain in Rome" could be appended to the three images when sent. As a further alternative, a simple click or multiple click procedure can be used to transmit the image and data without the verbal or text message. The description can then be added at the target device 142, either by key entry, or verbally using voice recognition software 144 installed in the target device 142.

The user of the image capture device 110 may capture and automatically transmit image data by utilizing either a single-action ("one click") technique or a multiple-action ("two click") technique. The user of the image capture device 110 may simply preselect a message target or a group of message targets so that upon capturing an image using any of the embodiments disclosed herein, or variations thereof the captured image is automatically transmitted along with image data. Using a single-action technique, the data to be appended to the image and the target are preselected. The one click necessary to capture the image also functions to transmit the image and data. Alternately, the device user may utilize a multiple-action technique by first capturing the photo data, and then subsequently selecting a message target or a group of message targets to trigger automatically transmitting the photo data. As a further alternative, a verbal, description, can be provided prior to, simultaneous with image capturing, immediately thereafter, or just prior to initiating transfer.

In a further embodiment, a user of image capture device 110 or digital camera 116 with data processor 310 may capture and automatically transmit image data by utilizing either a single-action ("one click") technique or a multiple-action ("multiple click") technique. For example, the device user may simply select a photo album and trigger both capturing and automatically transmitting image data using a single-action technique. In the single-action technique, a message target may not need to be selected because specific message targets may be associated with a particular photo album. Alternately, the device user may utilize a multiple-action technique by first capturing the image data, and then subsequently selecting a photo album to trigger automatically transmitting the image data. In certain instances, the device user may also include a separate middle step to choose specific message targets.

The present invention thus provides a streamlined, efficient, and user-friendly mechanism for distributing images, relevant data related thereto, and verbal labels and/or descriptions of the image to designated target devices 142 for viewing by designated parties or to automatically populate photo albums at designated target devices 142.

Figure 5:
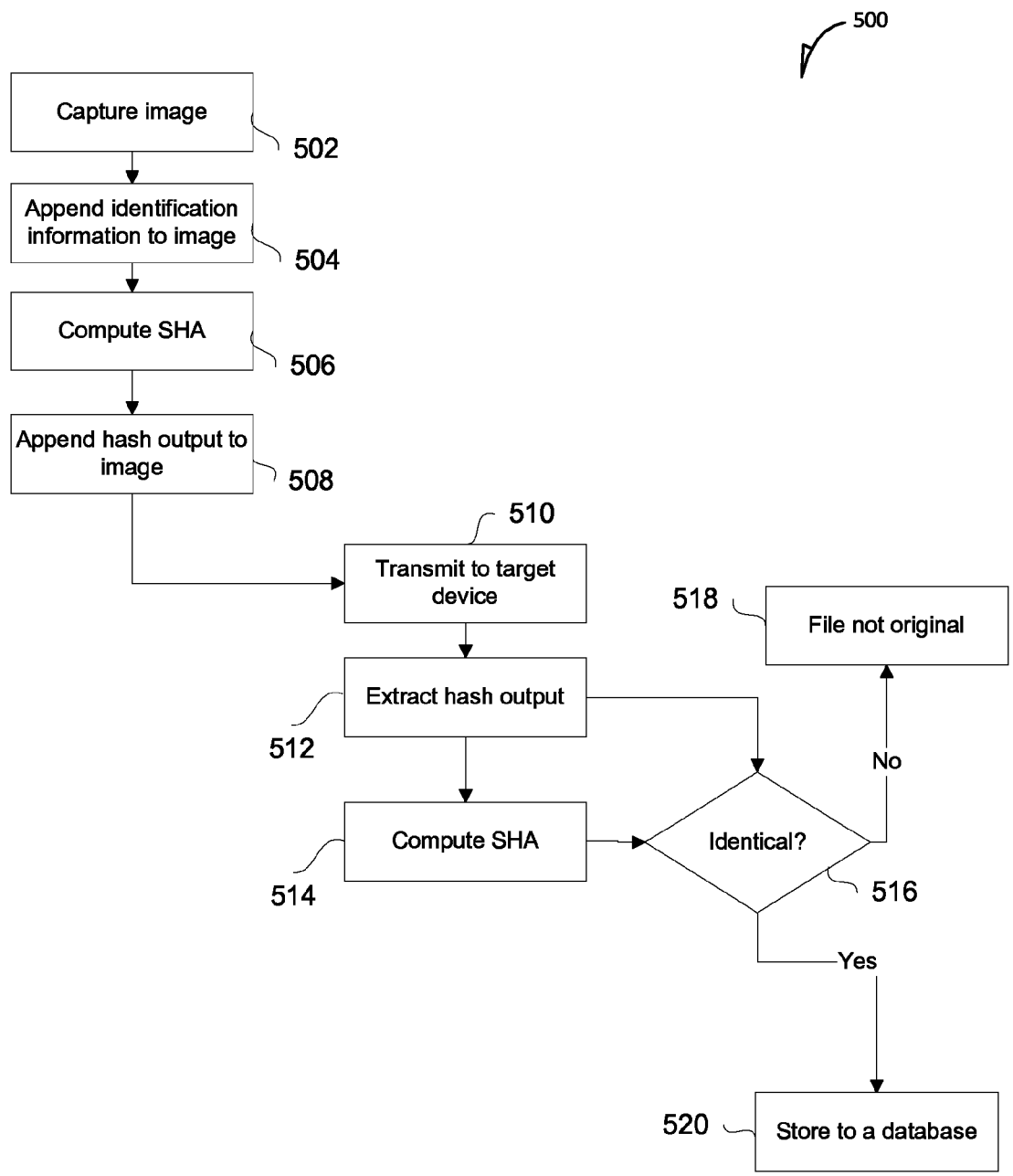
FIG. 5 is an operational flow diagram illustrating the steps for capturing and automatically transmitting an image using hashing.

FIG. 5 is an operational flow diagram illustrating the steps for capturing and automatically transmitting an image including a hash output. At step 502, an image can be captured. Then, identification information can be appended to the image at step 504, and at step 506, a secure hash for the image can be computed using a secure hash algorithm (for example, SHA-2). At step 508, the computed hash output can be appended to the captured image, and transmitted together with it to a target device at step 510. Upon receipt at the target device, the secure hash output can be extracted at step 512, and a separate secure hash for the original transmitted image can be computed at step 514. The hash codes can be compared to each other at step 516. If the hash codes are not identical, an indication that the transmitted image differs from the original in some way can be raised at step 518. If on the other hand, the hash codes are identical, the transmitted image can be stored in a database at step 520.

Figure 6:
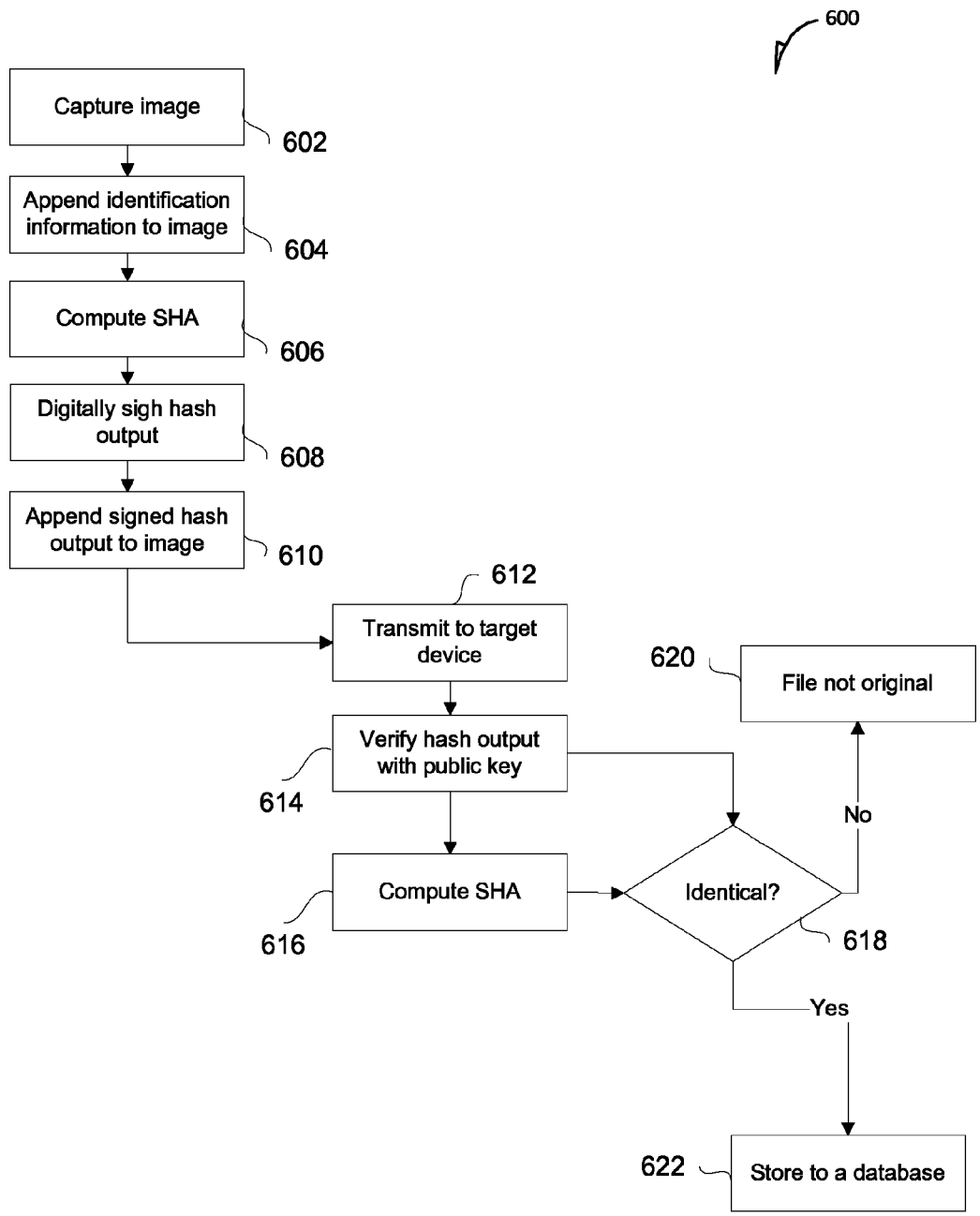
FIG. 6 is an operational flow diagram illustrating the steps for capturing and automatically transmitting an image using digitally signed hashing.

FIG. 6 is an operational flow diagram illustrating the steps for capturing and automatically transmitting an image using digitally signed hashing. At step 602, an image can be captured. Identification information can be appended to the image at step 604, and at step 606, a secure hash, for the image can be computed, using a secure hash algorithm (for example, SHA-2), At step 608, the hash output can be signed using a digital signature. At step 610, the digitally signed hash output can be appended to the captured image, and transmitted to a target device at step 612. Upon receipt at the target device, the signed hash digest can be verified using a public key at step 614, and a separate secure hash for the original transmitted image can be computed at step 616. The hash codes can be compared at step 618. If the hash codes are not identical, an indication that the file differs from the original in some way can be raised at step 620. If, on the other hand, the hash codes are identical, the transmitted image can be stored in a database at step 622.

Figure 7:
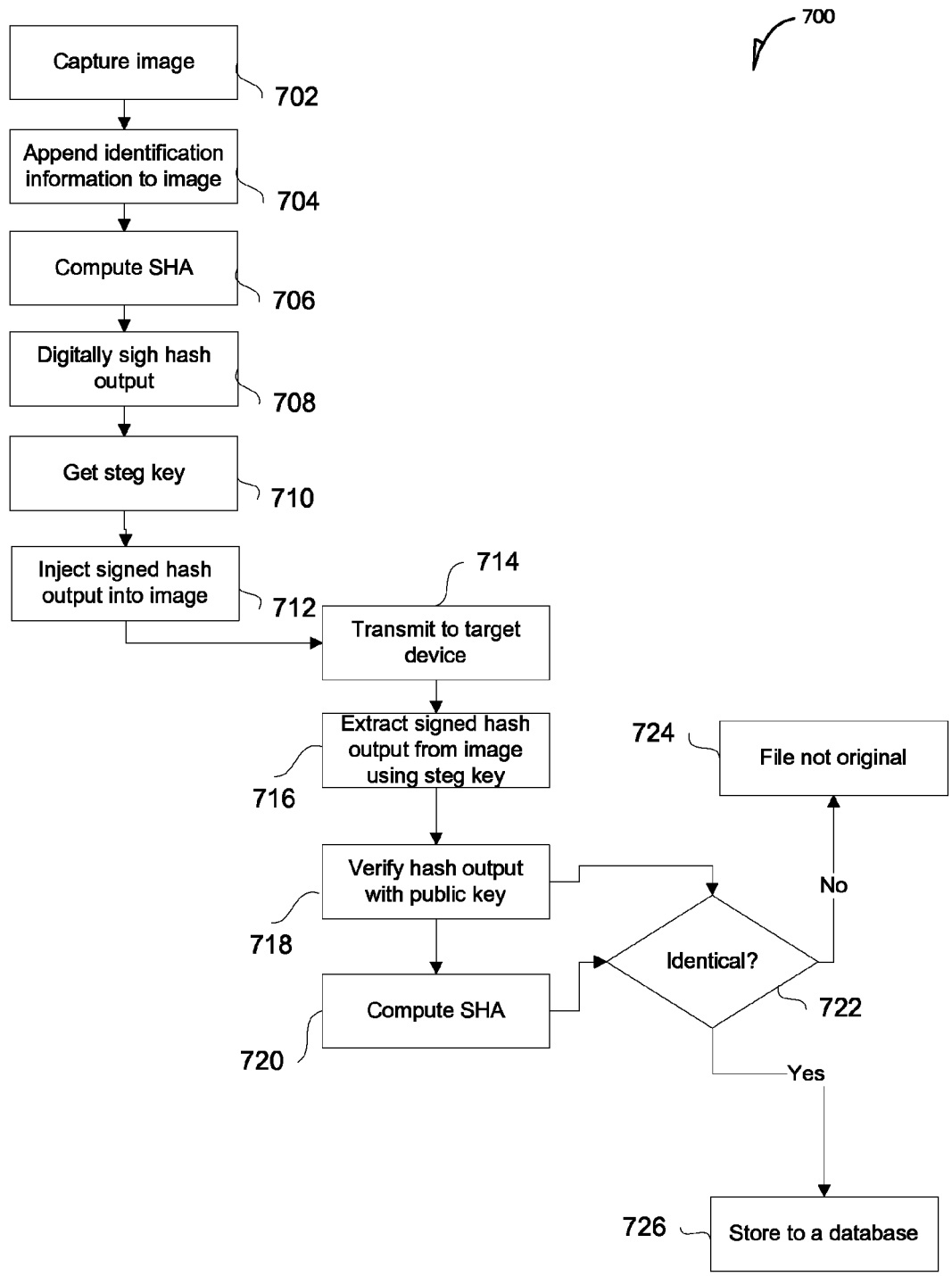
FIG. 7 is an operational flow diagram illustrating the steps for capturing and automatically transmitting an image using digitally signed hashing and steganography.

FIG. 7 is an operational flow diagram illustrating the steps for capturing and automatically transmitting an image using digitally signed hashing and steganography. At step 702, an image can be captured. Then, identification information can be appended to the image at step 704, and at step 706, a secure hash for the image can be computed using a secure hash algorithm (for example, SHA-2). At step 708, the hash output can be signed using a digital signature. Then, at step 710, a steg key can be obtained from a target device, and at step 712, the signed hash digest can be injected into the captured image. The image can be transmitted to the target device at step 714. Upon receipt at the target device, the signed hash digest can be extracted from the image using the steg key at step 716 and verified using a public key at step 718. Then, a separate secure hash for the original transmitted image can be computed at step 720. The hash codes can be compared at step 722, and if they are not identical, an indication that the transmitted file differs from the original in some way can be raised at step 724, or, if they are identical, the transmitted image can be stored in a database at step 726. The use of steganography gives the advantage of permanently attaching the hash digest to the image file.

In various embodiments as described herein, example embodiments include at least the following examples.

A system for capturing and transmitting digital data, the system comprising:

a digital camera for capturing visual data in a digital format;

a memory unit for storing the visual data captured by the digital camera;

a global positioning system chip for determining location data concerning a location where the visual data is captured by the digital camera, the location data being stored in the memory unit;

an application executable to annotate the visual data with time-stamp data, the time-stamp data being stored in the memory unit; and a wireless transmitter for secure transmission of the one or more of the following over a wirelesses network to a target site: the visual data, the location data, and the time-stamp data, wherein the target site is predetermined by the wireless transmitter and the visual data is maintained in a secure manner.

The system as claimed above, wherein the visual data includes individual digital images.

The system as claimed above, wherein the individual digital images are captured as a part of an album.

The system as claimed above, wherein the visual data includes video.

The system as claimed above, wherein the time-stamp information includes time and date that the visual data was acquired.

The system as claimed above, wherein the time-stamp information includes time and date that the visual data is transmitted to the target site.

The system as claimed above, wherein the visual data is transmitted concurrent with a user-generated annotation about the visual data.

The system as claimed above, wherein the user-generated annotation is a text, an audio recording, or a text obtained by voice recognition.

The system as claimed above, wherein the visual data, the location data, and the time-stamp data are transmitted immediately after acquiring.

The system as claimed above, wherein the visual data, the location data, and the time-stamp data are transmitted upon a user request.

The system as claimed above, wherein the target site is a web site designated by a user.

The system as claimed above, wherein the target site is an electronic in-box designated by the user.

The system as claimed above, further comprising an encryption module to encrypt verification information in the visual data.

The system as claimed above, wherein hashing is used to verily originality of one or more of the visual data, the location data, and the time-stamp data.

The system as claimed above, wherein the hashing is used in combination with a digital signature to verify the originality of one or more of the visual data, the location data, and the time-stamp data.

The system as claimed above, wherein the hashing is used in combination with the digital signature and steganography to verify the originality of one or more of the visual data, the location data, and the time-stamp data.

A method for capturing and transmitting digital data, the method comprising:
 capturing visual data in a digital format;
 storing the captured visual data in a digital format;
 acquiring location data based on a location where the visual data is captured by the digital camera, the location data being stored in a memory unit;
 annotating the visual data with time-stamp data, the time-stamp data being stored in the memory unit; and
 securely transmitting the visual data, the location data, and the time-stamp data over a wireless network to a pre-designated target site with no user input required to trigger transmission.

The method as claimed above, further comprising:
 appending identification information to the visual data;
 computing verification information for the visual data;
 appending the verification information to the visual data to be transmitted over a wireless network, to a pre-designated target site with no user input required to trigger transmission; and
 securely storing the visual data at the pre-designated target site.

The method as claimed above, wherein the visual data includes individual digital images.

The method as claimed above, wherein the individual digital images are captured as a part of an album.

The method as claimed above, wherein the visual data includes video.

The method as claimed above, wherein the time-stamp information includes time and date associated with acquisition of the visual data.

The method as claimed above, wherein the time-stamp information includes time and date associated with the visual data.

The method as claimed above, wherein the visual data is transmitted concurrently with a user-generated annotation associated with the visual data.

The method as claimed above, wherein the user-generated annotation includes a text, an audio recording, or a text obtained through voice recognition.

The method as claimed above, wherein the visual data, the location data, and the time-stamp data are transmitted substantially immediately after acquiring.

The method as claimed above, wherein the visual data, the location data, and the time-stamp data are transmitted upon a user request.

The method as claimed above, wherein the target site includes a web site designated by a user.

The method as claimed above, wherein the target site includes an electronic in-box designated by the user.

The method as claimed above, wherein hashing is used to verify originality of one or more of the visual data, the location data, and the time-stamp data.

The method as claimed above, wherein the hashing is used in combination with a digital signature to verify the originality of one or more of the visual data, the location data, and the time-stamp data.

The method as claimed above, wherein the hashing is used in combination with the digital signature and steganography to verity the originality of one or more of the visual data, the location data, and the time-stamp data.

The invention is set forth herein with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for capturing and transmitting digital data, the system comprising:
 a communication and photo capture device for capturing a visual representation of a document in a digital format;
 a memory unit for storing the visual representation of the document captured by the communication and photo capture device;
 a geo-coding capability for determining location data concerning a location where the visual representation of the document is captured by the communication and photo capture device, the location data being stored in the memory unit;

an application executable to annotate the visual representation of the document with time-stamp data, the time-stamp data being stored in the memory unit, the application executable being further configured to annotate the visual representation of the document with an identification tag; and a wireless transmitter for secure transmission of the following over a wireless network to a target site: the visual representation of the document, the location data, the time-stamp data, and the identification tag, wherein the visual representation of the document is maintained in a secure manner.

2. The system of claim 1, wherein the visual representation of the document includes individual digital images.

3. The system of claim 2, wherein the individual digital images are captured as a part of a set.

4. The system of claim 1, wherein the visual representation of the document includes video.

5. The system of claim 1, wherein the time-stamp information includes the time and date when the visual representation of the document was acquired.

6. The system of claim 1, wherein the time-stamp information includes the time and date when the visual representation of the document is transmitted to the target site.

7. The system of claim 1, wherein the visual representation of the document is transmitted concurrently with a user-generated annotation related to the visual representation of the document.

8. The system of claim 7, wherein the annotation is a text, an audio recording, or a text obtained by voice recognition.

9. The system of claim 1, wherein the visual representation of the document, the location data, the time-stamp data, and the identification tag are transmitted immediately after acquisition.

10. The system of claim 1, wherein the visual representation of the document, the location data, the time-stamp data, and the identification tag are transmitted upon a user request.

11. The system of claim 1, wherein the target site is a web site.

12. The system of claim 1, wherein the target site is an electronic in-box.

13. The system of claim 1, further comprising an encryption module to encrypt verification information in the visual representation of the document.

14. The system of claim 1, wherein hashing is used to verify originality of the visual representation of the document, the location data, the time-stamp data, and the identification tag.

15. The system of claim 14, wherein the hashing is used in combination with a digital signature to verify the originality of the visual representation of the document, the location data, the time-stamp data, and the identification tag.

16. The system of claim 15, wherein the hashing is used in combination with the digital signature and steganography to verify the originality of the visual representation of the document, the location data, the time-stamp data, and the identification tag.

17. A method for capturing and transmitting digital data, the method comprising:

capturing a visual representation of a document in a digital format;

storing the captured visual representation of the document in a digital format;

acquiring location data based on a location where the visual representation of the document is captured by a communication and photo capture device, the location data being stored in a memory unit;

annotating the visual representation of the document with time-stamp data, the time-stamp data being stored in the memory unit, and annotating the visual representation of the document with an identification tag; and securely transmitting the visual representation of the document, the location data, the time-stamp data, and the identification tag over a wireless network to a target site.

18. The method of claim 17, further comprising:

appending identification information to the visual representation of the document;

computing verification information for the visual representation of the document;

appending the verification information to the visual representation of the document to be transmitted over the wireless network to a pre-designated target site with no user input required to trigger transmission; and securely storing the visual representation of the document at the pre-designated target site.

19. The method of claim 17, wherein the visual representation of the document includes individual digital images.

20. The method of claim 17, wherein the individual digital images are captured as a part of a set.

* * * * *